(12) United States Patent
Deutloff et al.

(10) Patent No.: US 7,648,006 B2
(45) Date of Patent: Jan. 19, 2010

(54) REGULATING DEVICE FOR A MOTOR VEHICLE PARKING BRAKE

(75) Inventors: Norbert Deutloff, Thuengersheim (DE); Ekkehard Kraft, Retzstadt (DE); Roos Stephan, Wertheim (DE); Armin Sauer, Arnstein-Schwebenried (DE)

(73) Assignee: Siemens Aktiengesellschaft, Munich (DE)

( * ) Notice: Subject to any disclaimer, the term of this patent is extended or adjusted under 35 U.S.C. 154(b) by 503 days.

(21) Appl. No.: 11/087,723

(22) Filed: May 27, 2005

(65) Prior Publication Data

US 2006/0016642 A1    Jan. 26, 2006

(30) Foreign Application Priority Data

Jul. 23, 2004    (EP)   .................. 04017534

(51) Int. Cl.
    *F16D 65/36*    (2006.01)
(52) U.S. Cl. ................. 188/2 D; 188/156; 188/72.8
(58) Field of Classification Search ........... 188/2 D, 188/72.8, 156, 162, 265
See application file for complete search history.

(56) References Cited

U.S. PATENT DOCUMENTS

| | | | | |
|---|---|---|---|---|
| 5,180,038 A | * | 1/1993 | Arnold et al. | 188/171 |
| 5,590,744 A | * | 1/1997 | Belmond | 188/265 |
| 7,303,167 B2 | * | 12/2007 | Barba | 244/129.5 |

FOREIGN PATENT DOCUMENTS

| | | |
|---|---|---|
| DE | 10102685 | 8/2002 |
| DE | 10202730 | 9/2002 |
| EP | 0556064 | 8/1993 |
| EP | 1304491 | 4/2003 |
| WO | WO-98/56633 | 12/1998 |

OTHER PUBLICATIONS

Derwent Abstract for DE-10202730—Electrically operated parking brake apparatus for vehicle, has equalizer support shafts whose axis and line connecting the connecting portions of equalizer pass through center of screw threaded shaft.
Derwent Abstract for DE-10102685—Operating mechanism with load sensor for vehicle parking brake system, comprises direct connecting between actuator and brake cable wherein load sensor does not work as load transmission or coupling component.

* cited by examiner

*Primary Examiner*—Bradley T King
(74) *Attorney, Agent, or Firm*—K & L Gates

(57) ABSTRACT

The invention relates to a regulating device, in particular a motor vehicle parking brake with a regulating unit having a power-operated drive. To provide a regulating device which enables simple cable balancing, it is proposed that a hollow shaft be moved against a torsionally resistant stop as a function of the spring force of an elastic element, when the parking brake is released. The axial position of the stop thus ensures that an adequate cable bias force is always present.

10 Claims, 10 Drawing Sheets

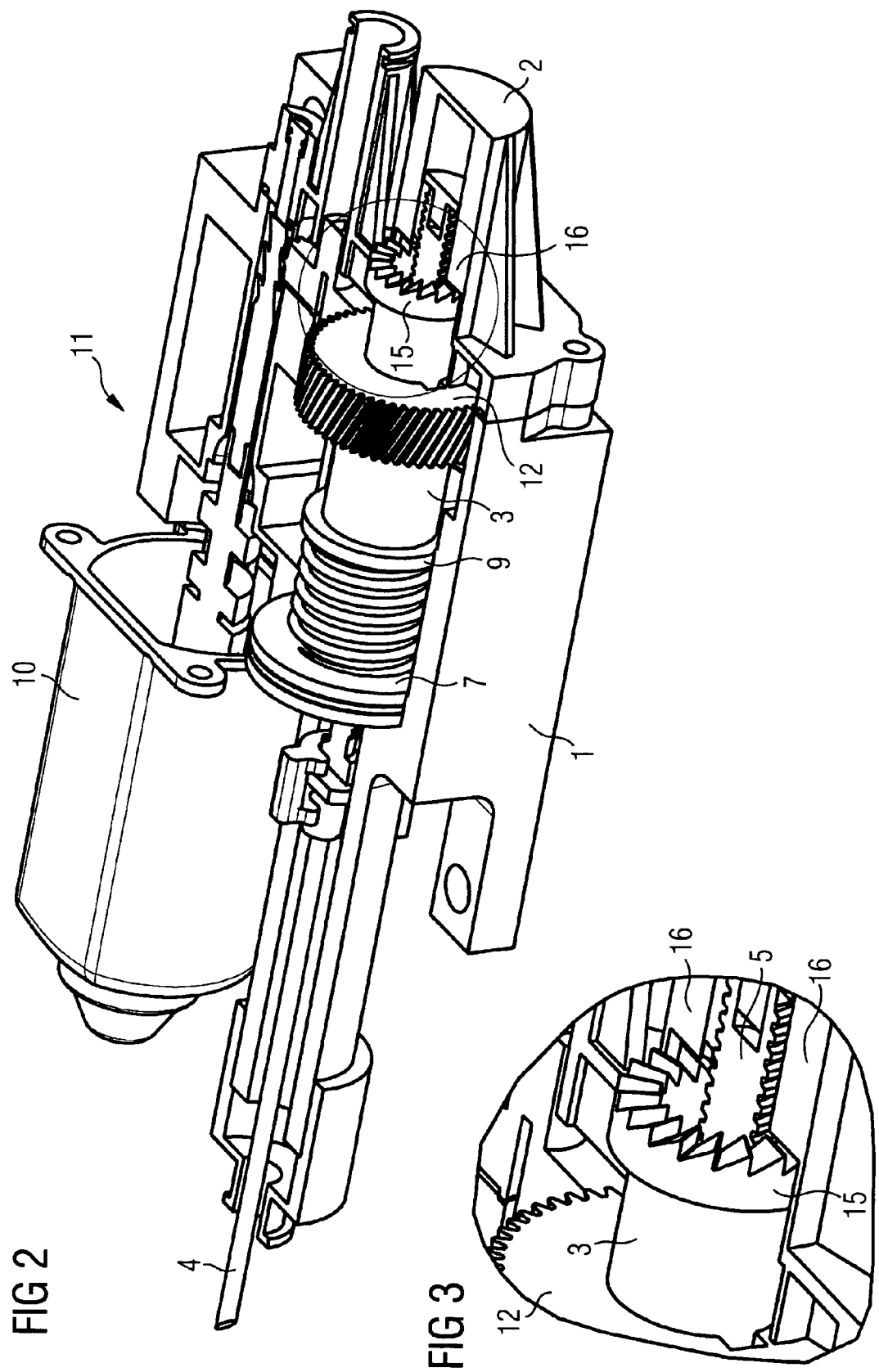

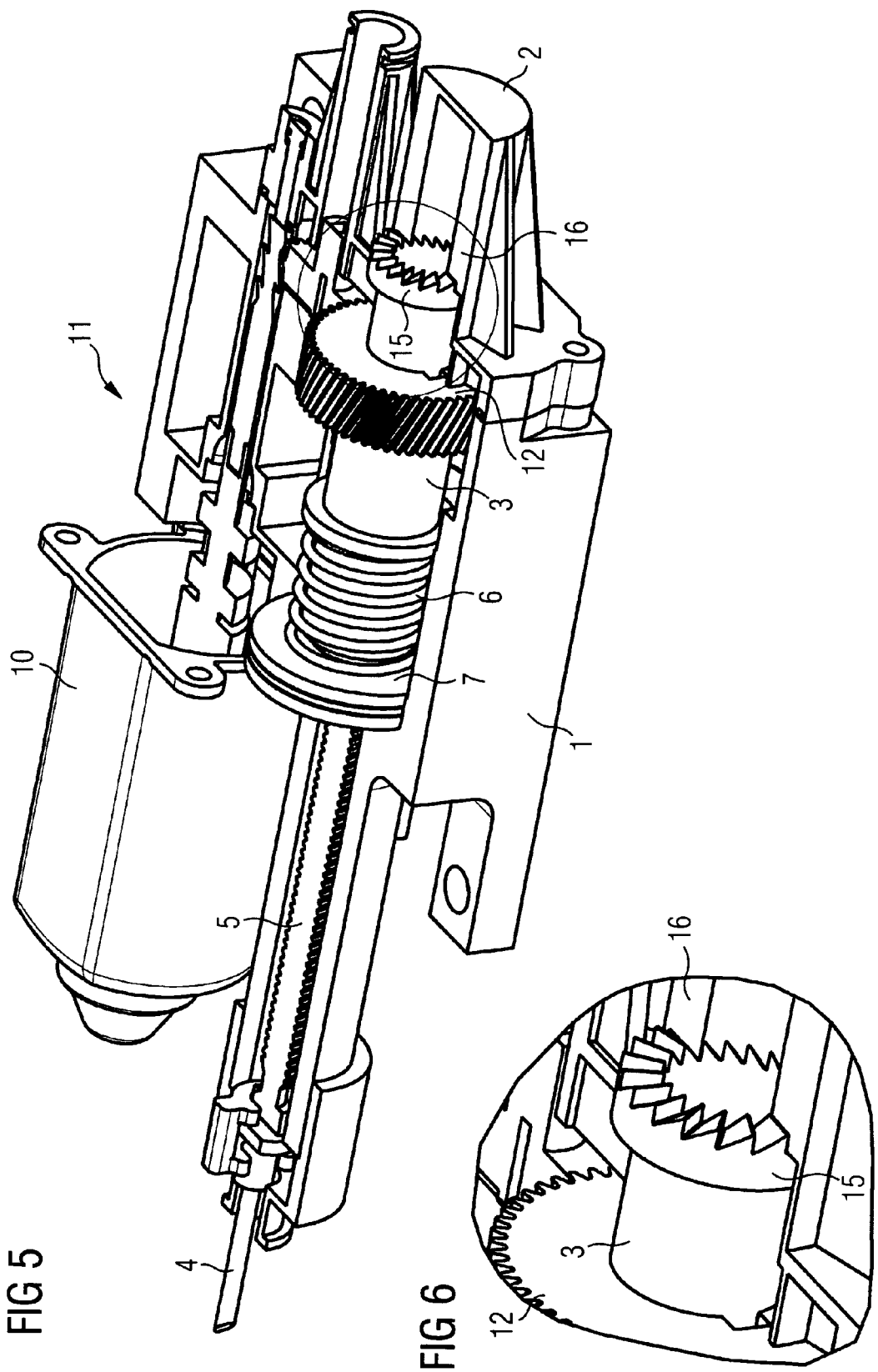

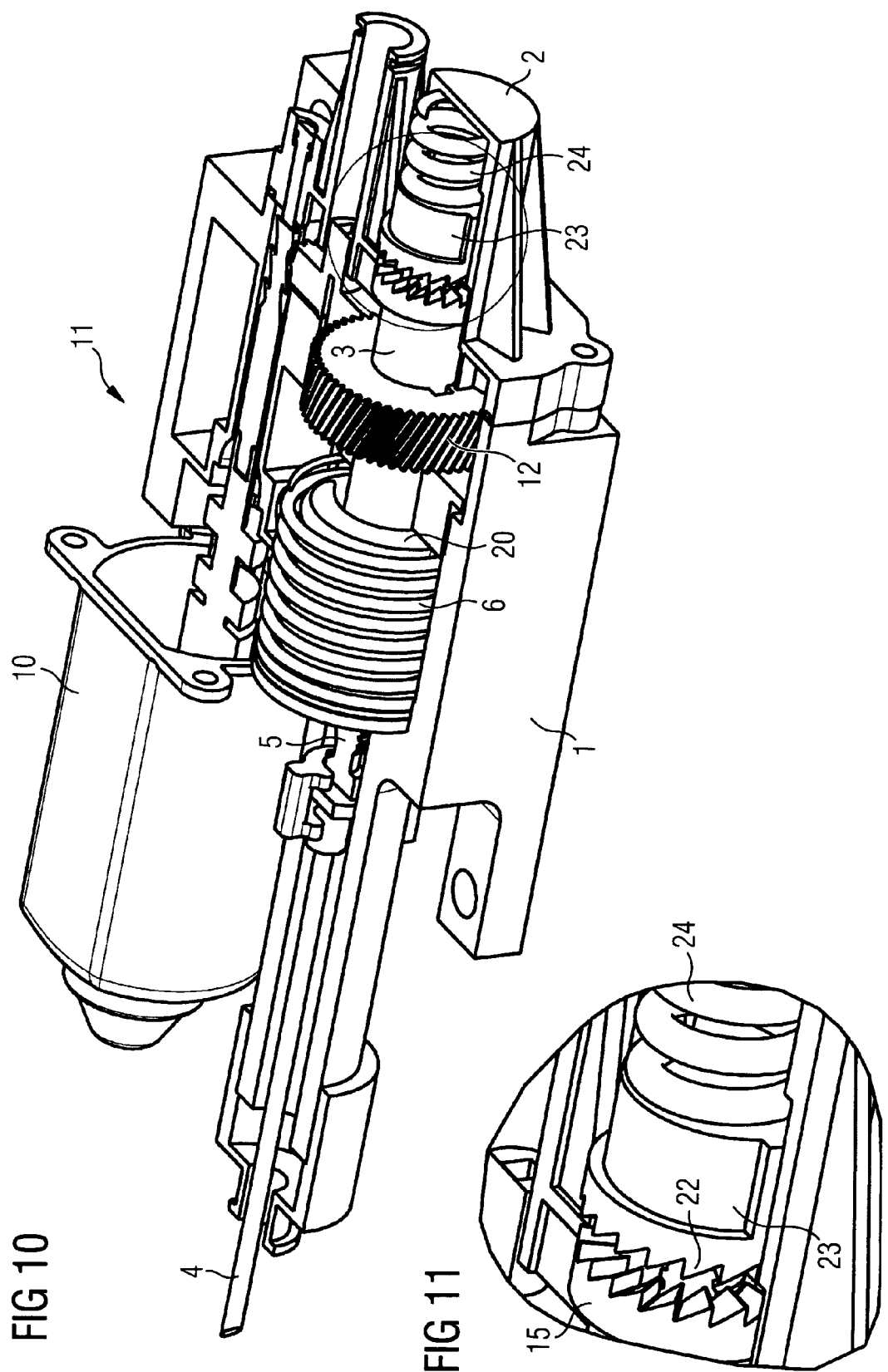

REGULATING DEVICE FOR A MOTOR VEHICLE PARKING BRAKE

BACKGROUND OF THE INVENTION

The invention relates to a regulating device, in particular a motor vehicle parking brake with a regulating unit comprising a power-operated drive.

During the operation of a parking brake, it is necessary to adjust the length of the brake cable, due to wear of the brake shoes for example or the settling behavior of the brake cable for example. This is to avoid essentially unnecessary cable travel when the brake cable is tightened so that said brake cable can be tightened in a quick and reliable fashion.

Mechanical adjustment devices are known from the prior art, which are mostly integrated into the force flow of the brake pull cable as a type of "mechanical series connection". The fundamental concept behind these types of adjustment devices is based on two teeth interlocking with each other and transmitting the cable force. As soon as the teeth are no longer interlocking with each other, the force flow is interrupted. Generally one of the teeth is designed as a rack and the other tooth as a latch. In this way, the latch engages in a specific tooth on the rack depending on wear.

With power-actuated parking brakes, electromotive parking brakes with a spindle drive for example, the adjustment takes place by means of path measurement in conjunction with corresponding control of the drive. The disadvantage with this is that path measurement and control of the drive require relatively expensive and error-prone components.

SUMMARY OF THE INVENTION

The object of the invention is to provide a regulating device, in particular a motor vehicle parking brake, with a regulating unit having a power-operated drive, which enables simple cable balancing.

This object is achieved by means of a regulating device according to claim 1. Advantageous embodiments of the invention are specified in the subclaims.

The regulating device according to the invention has a regulating unit with a power-actuated drive, a telescopic device in a housing or the like which can be moved axially in the longitudinal axis of the regulating unit, comprising a hollow shaft and a spindle shaft, which is axially connected to said hollow shaft by means of a rotary feed connection and which activated the brake pull cable, a drive connection between the power-actuated drive and the hollow shaft, an axial feed support between the hollow shaft on the one hand and the housing on the other hand via an elastic element which is stationary in relation to the spindle shaft and the brake pull cable and arranged parallel in the direction of the hollow shaft, and is axially loaded by the feed support and thus can be longitudinally deformed in an axial fashion.

A regulating device with these features is known from the former German patent application of the applicant with the official reference number 103 61 127.4. The complete disclosure of this former patent application is incorporated here into the disclosure of the current patent application.

According to the present invention, in addition to the regulating device known from the former patent application, the regulating device has a torsionally resistant axial stop to restrict the rotation of the hollow shaft. Rotation of the hollow shaft is thus stopped when the brake pull cable is released, when a specific cable bias force defined by the elastic element is reached.

A basic concept behind the invention is to provide cable balancing even in power-actuated parking brakes, which is essentially based on a mechanical system. Complicated, expensive and error-prone steps such as path measurement and control of the drive can thus be significantly reduced and/or completely dispensed with.

According to the invention, provision is made for a mechanical adjustment device to be integrated into the spindle drive of the spindle shaft actuating the brake pull cable. The simple structural design means that no control system is necessary to set a specific release force for the brake pull cable. Rather a defined minimum cable bias force is always present when the brake pull cable is released.

This is achieved structurally in that during the release process, the hollow shaft is pushed against the axial stop by means of the longitudinally deformable elastic element, if the cable force, in other words the force acting on the brake pull cable, is smaller than the bias force of the elastic element. The extent of the cable bias force can be adjusted by selecting the elastic element depending on the application in question.

In other words it is proposed that a hollow shaft be moved against a torsionally resistant stop as a function of the spring tension, when the parking brake is released. The axial position of the stop thus ensures that an adequate cable bias force is always present.

BRIEF DESCRIPTION OF THE SEVERAL VIEWS OF THE DRAWINGS

The invention and further advantageous embodiments according to the subclaims are described below with reference to the schematically represented exemplary embodiments, which are explained in more detail with reference to the drawings, in which:

FIG. 2 shows the regulating device according to FIG. 1 in a perspective representation with a partially cut-out housing, FIG. 3 shows an enlarged partial view from FIG. 2, FIG. 5 shows the regulating device according to FIG. 4 in a perspective representation with a partially cut-out housing FIG. 6 shows an enlarged partial view from FIG. 5, FIG. 10 shows the regulating device according to FIG. 9 in a perspective representation with a partially cut-out housing, FIG. 11 shows an enlarged partial view from FIG. 10.

DETAILED DESCRIPTION OF THE INVENTION

Figure 1:
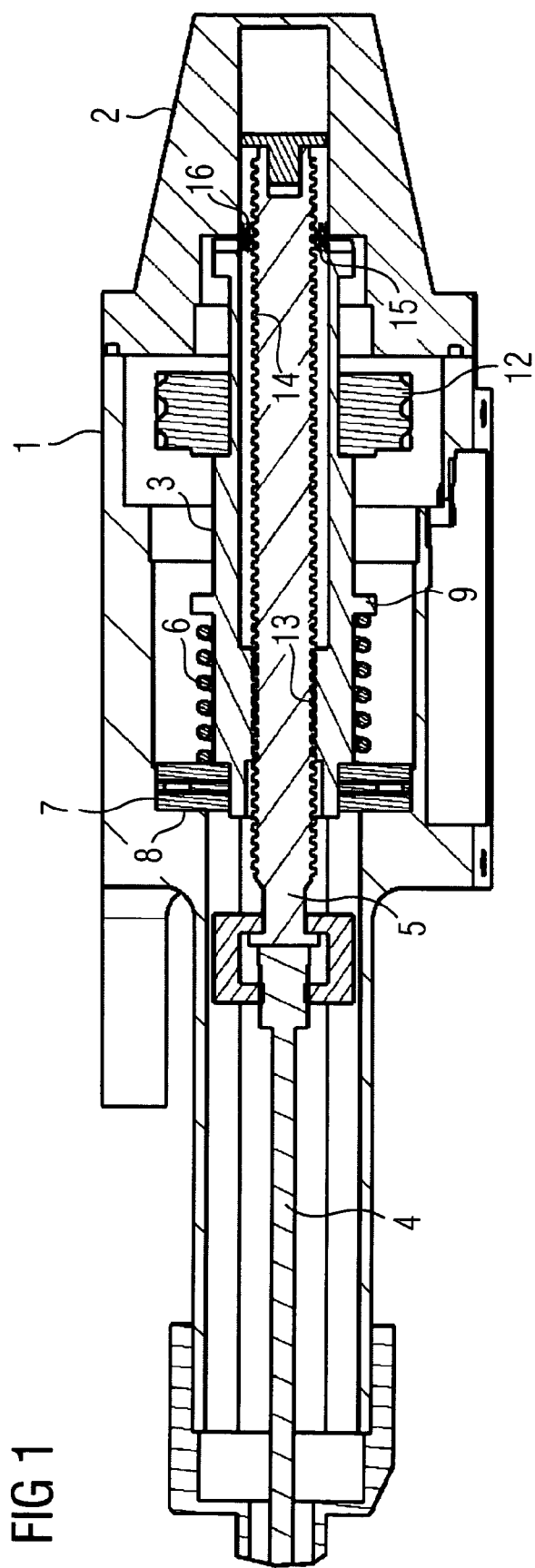
FIG. 1 shows a first embodiment of a regulating device with a tightened brake pull cable in a longitudinal section.

As shown in FIG. 1, an axially moveable telescopic device is accommodated by a housing 1 with an axially closing housing cover 2, said telescopic device having a hollow shaft 3 and a spindle shaft 5 connected to said hollow shaft by means of a rotary feed connection, operating a brake pull cable 4 and connected at its left end to a brake pull cable 4.

An elastic element 6 in the form of a spiral spring concentrically enclosing the hollow shaft 3 and/or the spindle shaft 5 is provided as a feed support for the hollow shaft 3, said spiral spring being positioned as a compression spring, with its one end resting against a shoulder 8 of the housing 1, by means of a fixed axial thrust bearing 7, and with its other axial end resting against a circumferential flange 9 of the hollow shaft 3.

FIG. 1 shows a brake position with a tightened brake pull cable. When the telescopic device is driven in the sense of a movement of the brake pull cable 4 to the right, i.e. in the sense of a tightening of a motor vehicle parking brake (not shown in further detail here), the elastic element 6 is compressed by pressure against the axial bearing 7.

A torque is thereby transmitted from an electric motor 10 of a regulating unit 11 (see. FIG. 2), via a transmission system (not shown in further detail) to an axially moveable drive transmission wheel 12 in the form of a toothed wheel, with a fixed drive connection to the hollow shaft 3. The hollow shaft 2, made to rotate by the drive transmission wheel 12, has an internal thread 13. An axial feed movement of the spindle shaft 3 is achieved by means of this internal thread 13 via the intermeshing external thread 14 of the spindle shaft 5.

A stop element 15 in the form of trapezoidal toothing around the hollow shaft edge is attached on the axial end of the hollow shaft 3 opposite the brake pull cable 4, see FIG. 2. The housing cover 2 is configured in the manner of a sleeve to accommodate the spindle shaft 5. At the edge of the sleeve a stop 16 also in the manner of trapezoidal toothing is arranged to interact with the stop element 15 of the hollow shaft 3. The trapezoidal toothing in the housing cover 2 is not completely shown for illustration reasons. Counter-clockwise rotation is not possible due to the asymmetrical saw-tooth type of toothing used, whilst clockwise rotation, in other words the retightening of the parking brake can be effected at any time.

In a tightened state the trapezoidal toothing is not engaged, so that rotation of the hollow shaft 3 is possible in both directions, see FIG. 3.

In order to release the brake cable, counter-clockwise rotation of the hollow shaft 3 is effected by means of the electric motor 10 so that the spindle shaft 5 moves counter-clockwise. The load acting on the brake pull cable 4 reduces as the release path increases. At the same time, the elastic element 6 expands. The load reduction causes the hollow shaft 3 and the drive transmission wheel 12 to be pushed to the right in the direction of the stop 16 by means of the spring force of the elastic element 6.

Figure 4:
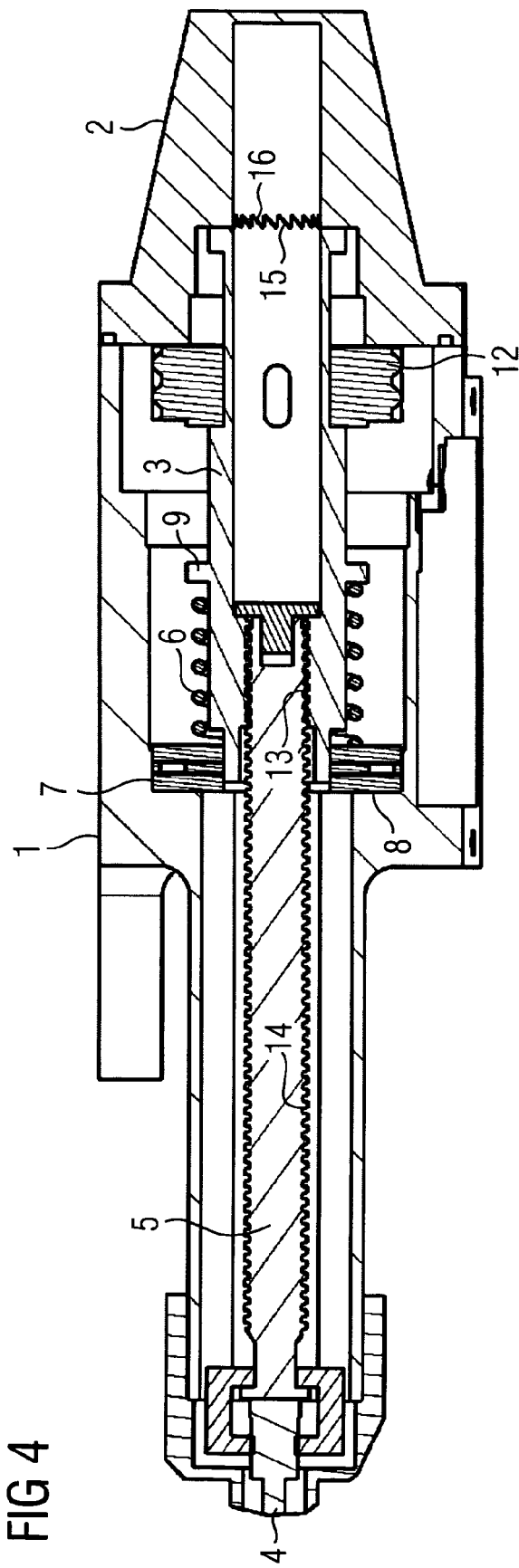
FIG. 4 shows the regulating device according to FIG. 1 with a released brake pull cable in a longitudinal section.

If the force (cable force) acting on the brake pull cable 4 is smaller than the bias force of the supporting elastic element 6 (spring force) at the axial bearing 7, the hollow shaft 3 is pushed with its stop element 15 against the stop 16 on the housing cover 2, see FIG. 4. Further rotation in the release direction is prevented by the specific configuration of the stop mechanism and the cable force does not therefore drop below a defined value. The engaged trapezoidal toothing is shown in FIGS. 5 and 6.

Figure 7:
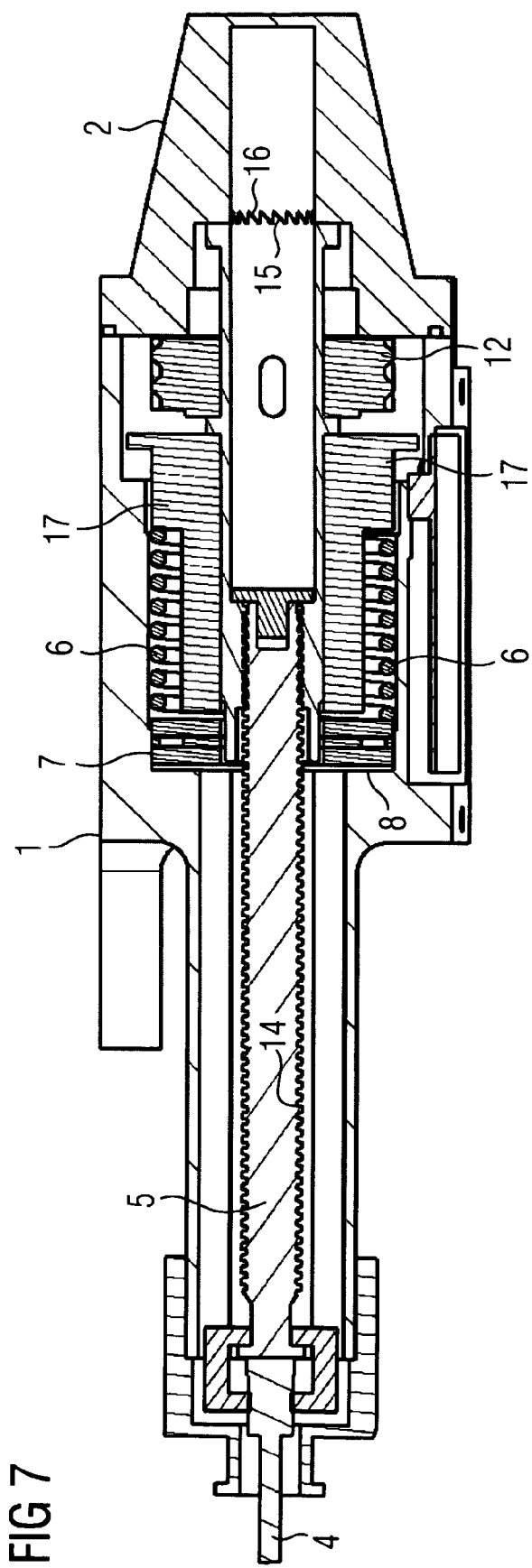
FIG. 7 shows a second embodiment of a regulating device with a released brake pull cable in a longitudinal section.

FIG. 7 shows a further embodiment of a regulating device with a released brake pull cable 4, in which a sensor 17 connected to the hollow shaft 3 is provided. The elastic element 6 is thereby supported between the axial bearing 7 and the sensor 17, so that the sensor 17 can serve to determine the spring path already covered and thus the axial position of the hollow shaft 3. This information is preferably used to ensure gentle engagement of the trapezoidal toothing at the stop 16. To this end the electric motor 10 is for example controlled such that the rotational speed and/or the regulating speed is reduced shortly before the stop 16.

Figure 8:
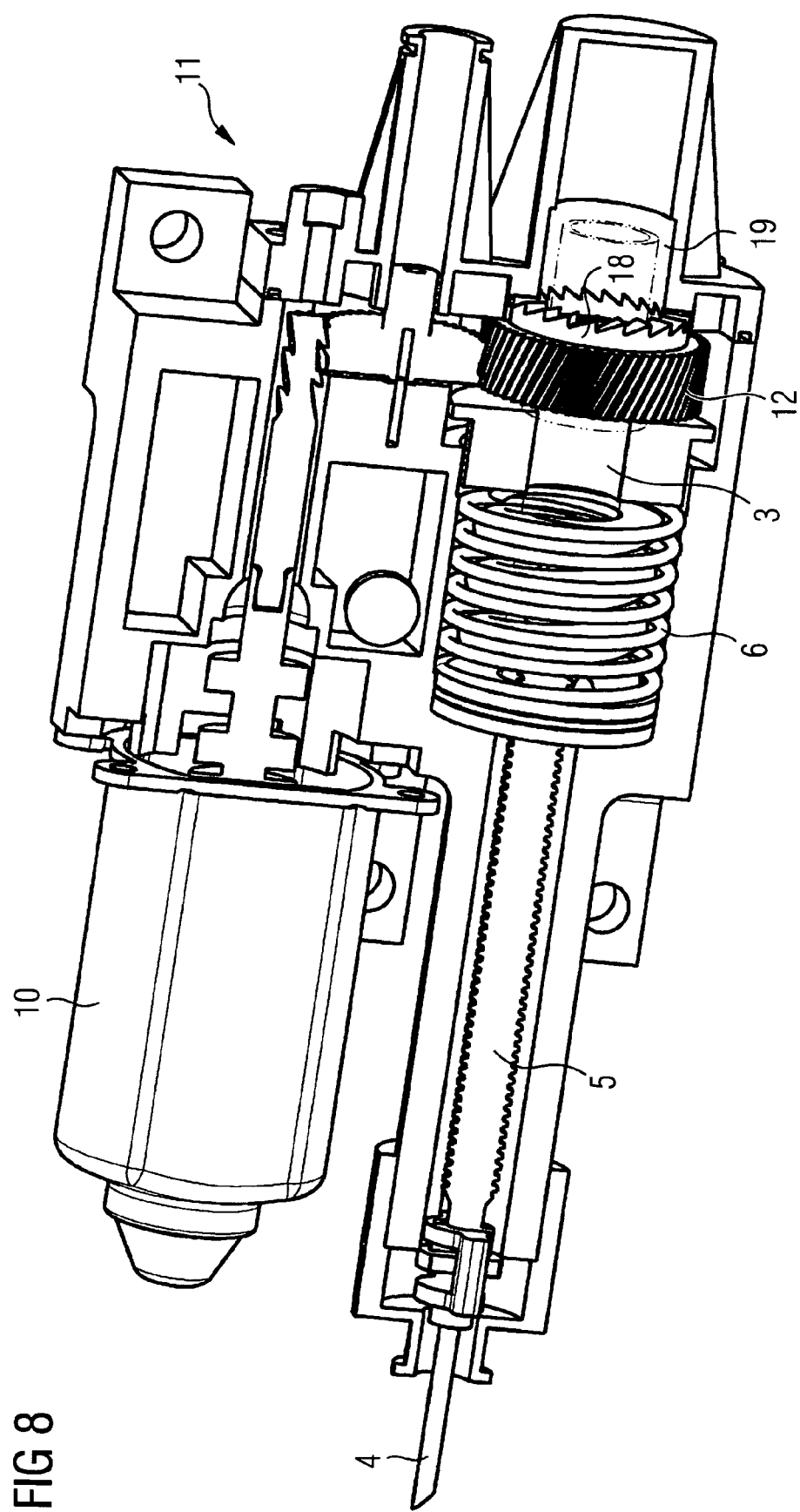
FIG. 8 shows a third embodiment of a regulating device with a released brake pull cable in a longitudinal section.
Figure 9:
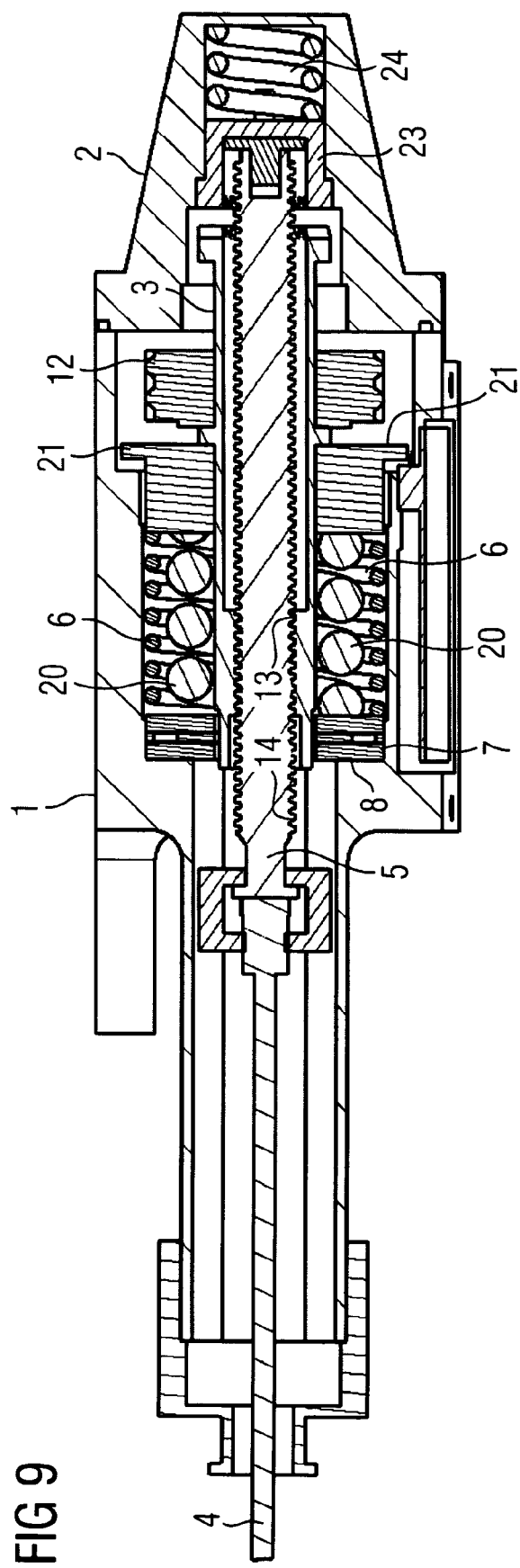
FIG. 9 shows a fourth embodiment of a regulating device with a tightened brake pull cable in a longitudinal section.
Figure 12:
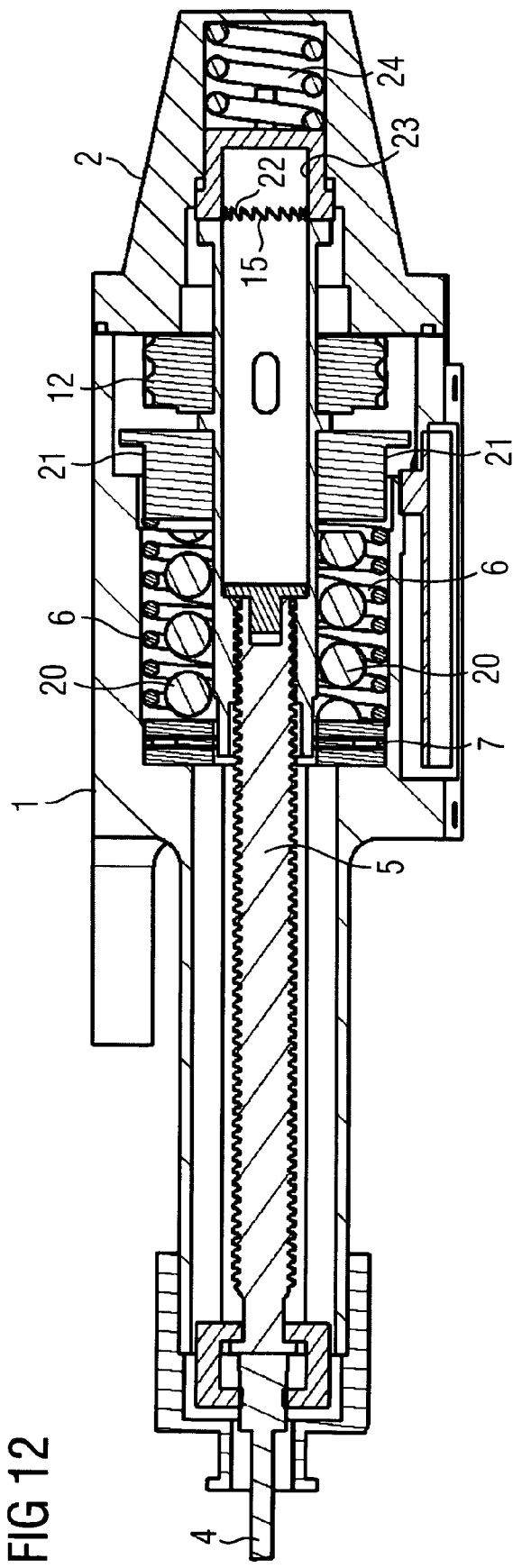
FIG. 12 shows the regulating device according to FIG. 9 with a released brake pull cable in a longitudinal section.
Figures 13, 14:
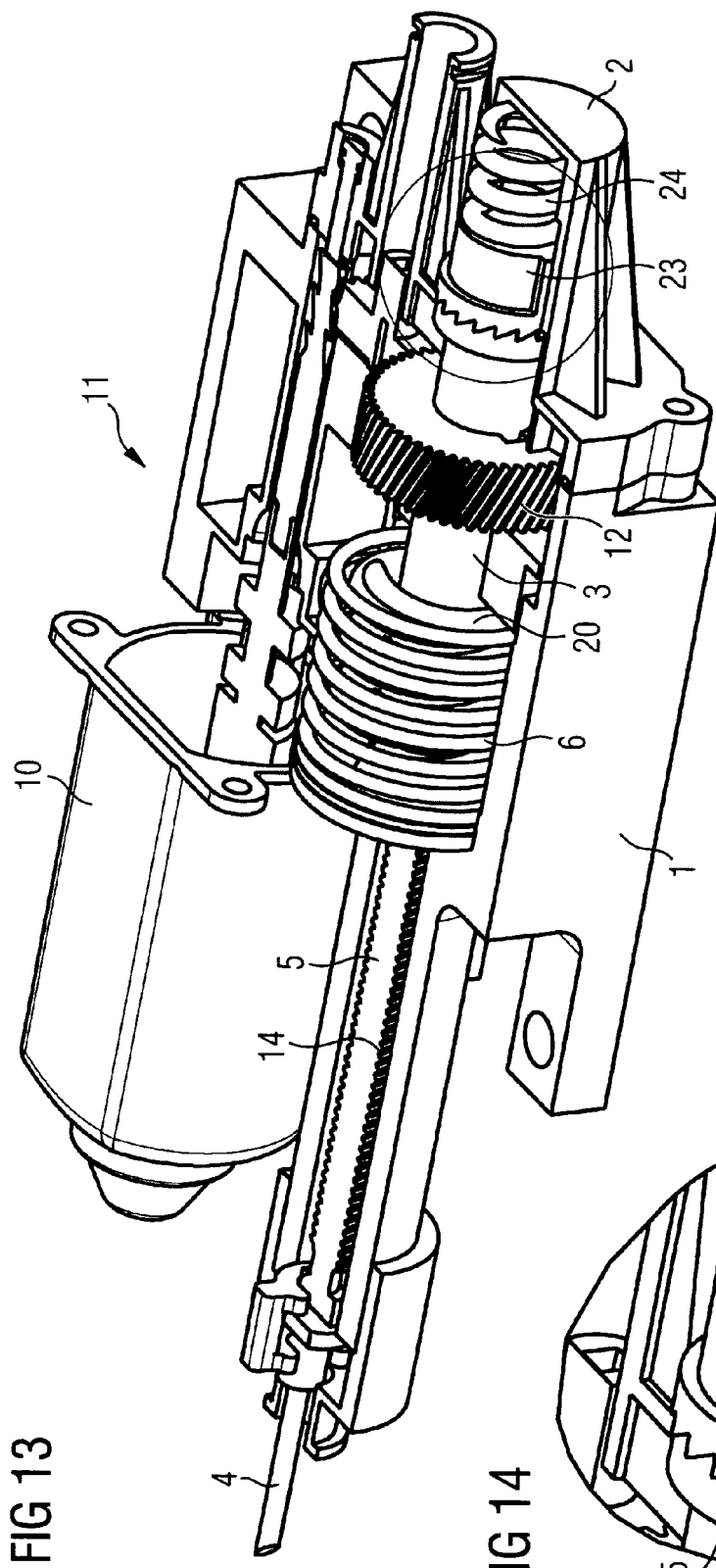
FIG. 13 shows the regulating device according to FIG. 12 in a perspective representation with a partially cut-out housing.
FIG. 14 shows an enlarged partial view from FIG. 13.

FIG. 8 shows a further embodiment in a released position, the stop element 18 not being directly attached to the hollow shaft 3 but rather to the drive transmission wheel 12. Accordingly, the stop 16 in the housing cover 2 is also configured on a sleeve 19 encompassing the hollow shaft 3. In this embodiment the drive transmission wheel 12 is fixed to the hollow shaft 3. One Particular advantage of this embodiment is the ease with which the stop element 18 can be produced in conjunction with the manufacture of the drive transmission wheel 12.

FIGS. 9 to 14 show a further embodiment of the regulating device. This differs from the previous embodiment on the one hand in that in addition to the first elastic element 6 which serves as a spring for the bias force of the brake pull cable 4, a second elastic element 20 is provided. This second elastic element 20 which is similarly configured in the form of a spiral spring serves as a spring for a force sensor. Both the first and the second elastic elements 6, 20 are thereby supported on the axial bearing 7 on the one hand and on the sensor 21 of the force sensor on the other hand, which is arranged on the hollow shaft 3. When the parking brake is tightened or released, the hollow shaft 3 and thus also the sensor 21 moves axially to the left or right. The path thereby covered is detected via the sensor pick-up 21 and provides a measure for the tightening force and/or braking force exerted by the electric motor 10 via the drive transmission wheel 12, the hollow shaft 3 and the spindle shaft 5 on the brake pull cable 4. In other words, conclusions can be drawn from this path information about the cable force in the tightened state.

Furthermore this embodiment differs in that the stop 22 in the housing cover 2 is not fixed, but is configured on an axially moveable sleeve-type counter-element 23. In the brake position shown in FIG. 9, the spindle shaft 5 pushes the counter-element 23 to the right against the spring force of a third elastic element 24, which is similarly configured as a spiral spring and is supported on the counter-element 23 on the one hand and on the housing cover 2 on the other hand. FIGS. 10 and 11 show the brake position with its released trapezoidal toothing.

In the case of a locked brake pull cable the trapezoidal toothing engages further to the right, since the spindle shaft 5 pushes the counter-element 23 to the right as a result of the support at the brake pull cable 4. The position of the sensor pick-up 21 is thus different from its position when the brake pull cable is released. It is thus possible to detect the locking of a brake pull cable 4 during release. By way of example, the driver of the motor vehicle can be informed of locking by means of a warning light.

When the brake position is released, the spindle shaft 5 moves to the left and relieves the load on the counter-element 23, so that the third elastic element 24 expands. The hollow nut 3 thus moves back to the right, see FIG. 12. If the cable force is smaller than the spring force of the second elastic element 20, the stop element 15 engages at the counter-element 24 and further rotation in the release direction is prevented.

If the brake pull cable 4 is locked during release, the spindle shaft 5 would not move to the left during release either. The sensor pick-up 21 would thus move further to the right than would be the case with a brake cable that is not locked. Locking could be detected in a simple fashion by evaluating the path signal of the sensor pick-up 21.

The spring system comprising the first, second and third elastic elements 6, 20, 24 is thus tailored to the application in that different path points of the axial path of the hollow shaft 3 are assigned different resulting spring strengths. So for example, a first path point "cable released" is defined by the "disengaging" of the second elastic element 20. From this point onwards the hollow shaft 3 is only supported by the first elastic element 6, which pushes the hollow shaft 3 against the stop. Reaching the stop then defines a second path point "stop with defined cable bias force". If the stop point moves, because the third elastic element 24 is pushed against the first elastic element 6, a further path point "stop moved" is thereby defined.

We claim:

1. A regulating device for a motor vehicle parking brake, comprising:
   a regulating unit having a power-operated drive, a telescopic device which can be moved axially in the longitudinal axis of the regulating unit in a housing, comprising:
   a hollow shaft and a spindle shaft being axially connected to the hollow shaft by means of a rotary feed connection and operating a brake pull cable,
   a drive connection between the power-operated drive and the hollow shaft,
   an axial feed support between the hollow shaft on the housing, via an elastic element, the elastic element being stationary in relation to the spindle shaft and the brake pull cable and arranged parallel in the direction of the hollow shaft, and is axially loaded by the feed support and configured to be longitudinally deformed in an axial fashion, and
   an axial stop against which the hollow shaft is pushed by means of the elastic element to restrict the rotation of the hollow shaft when the brake pull cable is released when a specific cable bias force defined by the elastic element is reached.

2. The regulating device according to claim 1, further comprising a stop element arranged on the hollow shaft.

3. The regulating device according to claim 1, further comprising a stop element arranged on a drive transmission wheel of the hollow shaft, said drive transmission wheel serving to establish the drive connection with the drive.

4. The regulating device according to claim 2, wherein the stop and stop element being configured such that on the one hand further release of the brake pull cable is excluded after reaching the stop and on the other hand tightening of the brake pull cable is possible at any time.

5. The regulating device according to claim 4, wherein the stop and/or stop element are configured in the manner of trapezoidal toothing.

6. The regulating device according to claim 1, wherein the stop is configured as a fixed stop.

7. The regulating device according to claim 1, wherein the stop is configured as an axially moveable counter-element.

8. The regulating device according to claim 7, further comprising an axial feed support between the counter-element on the one hand and the housing on the other hand, via a further elastic element, which is axially loaded by the feed support and can thus be longitudinally deformed in an axial fashion.

9. The regulating device according to claim 7, further comprising means for effecting axial movement of the counter-element by means of the spindle shaft.

10. The regulating device according to claim 1, wherein the elastic element is configured as a spiral spring.

* * * * *